Patented Nov. 22, 1949

2,489,167

UNITED STATES PATENT OFFICE 2,489,167

ISOPENILLIC ACID G AND PROCESS FOR PREPARING THE SAME

Nelson R. Trenner, Westfield, N. J., assignor to Merck & Co., Inc., Rahway, N. J., a corporation of New Jersey No Drawing. Application January 5, 1946, Serial No. 639,488

4 Claims. (Cl. 260—309)

This invention relates to a new chemical compound, isopenillic acid G, which is useful in the synthesis of penicillin and chemically related compounds having antibiotic activity, and to the process for preparing the same.

In preparing isopenillic acid G, I preferably use as a starting material penillic acid G, an optically active compound having the empiric formula $C_{16}H_{18}N_2O_4S$ and melting at about 191–192° C., which can be prepared by reacting sodium penicillin G with a mineral acid in aqueous solution at pH 2–3. The resulting solution on standing at room temperature for about 1½ hours deposits crystals of penillic acid G. Precipitation of the penillic acid G is complete after standing at room temperature overnight and the crystalline product is recovered by filtration.

Sodium penicillin G is in turn prepared by propagating the organism Pencillium notatum #832 NRRL in a nutrient medium, extracting the medium with a suitable solvent such as amyl acetate, and converting the penicillin G thus obtained to sodium penicillin G by treating with a suitable base such as sodium bicarbonate.

Penicillin G is distinguished from other penicillins by the presence of the characteristic benzyl group which leads to the formation of phenylacetic acid as one of the reaction products when penicillin G is subjected to acid or alkaline hydrolysis. The designation "G" in penillic acid G and isopenillic acid G also indicates that the characteristic benzyl group is present in these compounds.

Isopenillic acid G is prepared in accordance with the present invention by reacting penillic acid G with methanol either by heating to reflux or by heating at about 64° C. in a sealed tube, or other closed system. In about 24 hours of heating to reflux, the optical rotation of the system, which originally is strongly positive, drops to 0°; and upon longer heating, particularly in a closed system, the solution takes on a negative rotation reaching about —38° after a total of about 67 hours' heating in a closed system.

When the reaction is complete, as evidenced by the reaction mixture assuming a constant lowered specific rotation at a given temperature, the reaction mixture is concentrated to small volume whereupon a crystalline product separates. This product, isopenillic acid G, melts at about 168–173° C., with decomposition, shows an optical rotation $(\alpha)_D^{23} = -68°$ (c, 0.4% in methanol), and shows three distinct points of binding upon potentiometric titration indicating that the product is a tribasic acid compound.

The following examples indicate how procedures of the present invention can be carried out, but it is to be understood that these examples are given by way of illustration and not of limitation.

Example I

To 18.58 mg. of pure penillic acid G was added 5 ml. of methanol and the system refluxed. From time to time, samples were withdrawn and the optical rotation examined. The optical rotation was observed to fall to 0° in about 24 hours. A lead acetate tube attached to the outlet of the reflux condenser turned black indicating the evolution of hydrogen sulfide. Simultaneously with the above changes, the ultra-violet absorption spectrum indicated the formation of a methanolytic product having an intense absorption band of $E_M$ 19500 at 2200 Å. Potentiometric titration of an aliquot showed the presence of a dibasic acid, isopenillic acid G, with pH ½ values of 3.3 and 6.0.

Example II

About 94 mgm. of penillic acid G was suspended in 5 ml. of methanol and the whole sealed in an ampul. After heating this system at about 64° C. for 52 hours with occasional shaking, all of the solid had gone into solution. The optical rotation was observed to be —13°. After further heating for a total of 67 hours, the optical rotation was observed to be —38°.

Concentration of this reaction solution resulted in crystallization of a product having a mass equal to about 40% of the mass of the penillic acid taken. Although some hydrogen sulfide was evolved in the foregoing reaction, the crystalline product isolated still contained sulfur.

The crystalline product, isopenillic acid G, melted at 168–173° C., with decomposition, gave positive azide and ferric chloride tests (the latter yielding a stable blue precipitate), showed an optical rotation $(\alpha)_D^{23} = -68°$ (c, 0.4% in methanol), and upon potentiometric titration gave pH ½ values 3.8, 6.7, and a third region of binding in the pH range of about 10.5.

The ultra-violet absorption spectrum for this product dissolved in methanol and in pH 8.4 buffer solution was as follows:

| Wavelength, Å. | $E_M$ | |
| --- | --- | --- |
| | CH₃OH | pH 8.4 Buffer |
| 2,600 | 2,000 | 1,500 |
| 2,500 | 5,800 | 5,800 |
| 2,400 | 9,800 | 10,300 |
| 2,300 | 12,100 | 12,400 |
| 2,250 | 13,000 | 12,700 |
| 2,200 | 13,600 | 13,000 |

Modifications can be made in the procedures herein described without departing from the spirit and scope of the present invention, and I am to be limited only by the appended claims.

What is claimed is:

1. The process that comprises heating penillic acid G with methanol until reaction therebetween is complete as evidenced by the reaction mixture assuming a constant lowered optical rotation, concentrating the reaction mixture to small volume, and recovering the crystalline isopenillic acid G thus formed.

2. The process that comprises heating under reflux a mixture of penillic acid G and methanol, continuing heating for an extended period of time and until reaction is complete as evidenced by the reaction mixture assuming a constant lowered optical rotation, and recovering isopenillic acid G from the reaction mixture.

3. The process that comprises heating in a sealed system a mixture of penillic acid G and methanol, continuing heating for an extended period of time and until reaction is complete as evidenced by the reaction mixture assuming a constant lowered optical rotation, and recovering isopenillic acid G from the reaction mixture.

4. As a new composition of matter, isopenillic acid G, the crystalline product melting at about 168–173° C., with decomposition, and having an optical rotation $(\alpha)_D^{23} = -68°$ (c, 0.4% in methanol), which is obtained from penillic acid G by the process as defined in claim 1.

NELSON R. TRENNER.

REFERENCES CITED

The following references are of record in the file of this patent:

O. S. R. D. Report, Squibb Institute for Medical Research (S-24 at pages 11 and 12), July 1944.